United States Patent
Obrist

[11] Patent Number: 5,492,029
[45] Date of Patent: Feb. 20, 1996

[54] ANTILASH DRIVING APPARATUS FOR ROTATING A SPINDLE OR A WORK PIECE RECEIVING MEMBER OF A MACHINING APPARATUS

[75] Inventor: Basil Obrist, CH-Gontenschwil, Switzerland

[73] Assignee: Erowa AG, Reinach, Switzerland

[21] Appl. No.: 301,358

[22] Filed: Sep. 6, 1994

[30] Foreign Application Priority Data

Sep. 8, 1993 [DE] Germany ............ 43 30 313.7

[51] Int. Cl.$^6$ ............ F16H 57/12; B23H 7/26
[52] U.S. Cl. ............ 74/409; 74/440; 219/69.15
[58] Field of Search ............ 74/440, 409; 219/69, 219/69.15

[56] References Cited

U.S. PATENT DOCUMENTS

| | | | |
|---|---|---|---|
| 2,310,232 | 2/1943 | Hale | 74/440 |
| 2,343,110 | 2/1944 | Hale | 74/440 |
| 3,365,973 | 1/1968 | Henden | 74/440 |
| 3,648,534 | 3/1972 | Fagarazzi | 74/440 |
| 4,423,302 | 12/1983 | Shimizu | 219/69 G |
| 4,471,197 | 9/1984 | Inoue | 219/69.12 |
| 4,739,670 | 4/1988 | Tomita et al. | 74/440 |
| 4,747,321 | 5/1988 | Hannel | 74/440 |
| 4,877,935 | 10/1989 | Aso et al. | 219/69.12 |
| 4,990,737 | 2/1991 | Obara | 219/69.12 |
| 5,269,198 | 12/1993 | Fukushima | 74/527 |

*Primary Examiner*—Rodney H. Bonck
*Assistant Examiner*—David Fenstermacher
*Attorney, Agent, or Firm*—Tarolli, Sundheim & Covell

[57] ABSTRACT

The driving apparatus for the spindle of an electro erosive machining apparatus comprises an electric motor adapted to be operated to rotate in two opposite directions and a reduction gear box assembly operatively coupled to the electric motor. The gear assembly is provided with a pinion and two gear wheels which are rotatable with reference to each other. Both gear wheels mesh with the pinion. One of the gear wheels is under the influence of a torsional biasing force. A first of the gear wheels is torsionally fixedly connected to the spindle of the electro erosive machining apparatus, while the second gear wheel is rotatable with reference to the spindle. Such a driving apparatus operates with low expenditure without backlash in both senses of rotation whereby an eventually occurring wear is automatically compensated.

11 Claims, 3 Drawing Sheets

# ANTILASH DRIVING APPARATUS FOR ROTATING A SPINDLE OR A WORK PIECE RECEIVING MEMBER OF A MACHINING APPARATUS

FIELD OF THE INVENTION

The present invention refers to a driving apparatus for the rotation of the spindle or the work piece receiving member of an electro erosive machining apparatus.

It is well known in the art that an electro erosive machining apparatus ensures an extremely precise machining of work pieces by removing work piece material under the effect of electro erosion. In order to achieve an accurate shaping of a work piece, the parts and elements of the electro erosive machining apparatus have to be manufactured and must operate with at least an equal precision, if possible with an even higher degree of precision than the desired accuracy of shaping of the work piece.

In the case of e.g. a spark erosion machining apparatus, an electrode is used to machine the work piece, said electrode being received in a spindle of the apparatus and can be raised and lowered as well as rotated. A driving means is provided to rotate the spindle and thereby the electrode, said driving means usually comprising an electric motor. In order to displace the electrode into a desired angular orientation, the spindle is rotated by the electric motor via a reduction gearbox. The exact angular position of the spindle, thereby, is monitored by an incremental angle encoder which is connected to a control unit for controlling the rotational movement and the angular position of the spindle.

One of the main problems in connection with known driving devices of the kind referred to herein above is the transmission backlash between motor shaft, gear box and spindle. Thus, one was forced to use extremely precisely manufactured reduction gear boxes and power transmission elements in order to achieve the desired high positional accuracy of the angular position of the spindle. Such a driving apparatus, however, is very expensive, requires a frequent maintenance and is subject to wear out comparatively quickly; thus, the precision to be achieved is impaired. The same facts are true for a driving apparatus for the rotation of work piece pallets.

PRIOR ART

In order to solve these problems, it is proposed in the German Patent Nr. 37 11 819 to use a driving apparatus for the rotation of the spindle or the work piece pallet of an electro erosive machining device. The apparatus comprises at least two electric motors adapted to be operated to rotate in two opposite directions. Reduction gear means are associated with each of the electric motors each including an input member operatively connected to the associated electric motor and driven by said electric motor as well as an output member operatively connected to the spindle or the work piece pallet of the electro erosive machining device. Further, the apparatus comprises a incremental angle encoder operatively connected to the spindle or the work piece pallet of the electro erosive machining device to monitor the actual angular position of the spindle or the pallet. Finally, there are provided control means including power supply means operatively connected to said at least two electric motors as well as to the incremental angle decoder. The control means operates at least two of the electric motors to rotate in opposite directions and/or to yield different values of torque in any operating condition of the driving apparatus.

Thus, the entire transmission assembly, i.e. the reduction gear box as well as the associated transmission elements, are maintained always under a certain bias torque which prevents backlash in the gear box and any clearance between the gear wheels and compensates for the elasticity which is always present in a mechanical transmission system.

Such a driving apparatus has proven to be very reliable and allows an ultra precise angular positioning of the spindle of an electro erosive machining apparatus, but the expenditure as far as the mechanical design is concerned (two electric motors, two gear boxes) and as far as the electronic control is concerned is very high; consequently, such a driving apparatus is very expensive. In many cases, it would be desirable to have available a driving apparatus for an electro erosive machining apparatus which admittedly operates with a very high accuracy, but which is less expensive.

OBJECTS OF THE INVENTION

It is an object of the present invention to provide a driving apparatus for the spindle or the work piece receiving member of an electro erosive machining apparatus which is much simpler in design and, consequently, can be manufactured at much lower costs.

It is a further object of the invention to provide a driving apparatus for the spindle or the work piece receiving member of an electro erosive machining apparatus which nevertheless allows an angular positioning of the spindle of the electro erosive machining apparatus with very high accuracy, even if the use of precisely machined elements and parts of the gear box is avoided.

It is a still further object of the invention to provide a driving apparatus for the spindle or the work piece receiving member of an electro erosive machining apparatus which is insensitive to wear even after prolonged operation.

Finally it is a still further object of the invention to provide a driving apparatus for the spindle or the work piece receiving member of an electro erosive machining apparatus which is of very compact dimensions.

SUMMARY OF THE INVENTION

To meet these and other objects, the invention provides a driving apparatus for the rotation of the spindle or the work piece receiving member of an electro erosive machining apparatus, comprising an electric motor adapted to be operated to rotate in two opposite directions, a reduction gear assembly associated with the electric motor including an input member operatively connected to the electric motor and driven by the electric motor as well as an output member operatively connected to the spindle or the work piece receiving member of the electro erosive machining apparatus.

Further, there is provided an angular position sensing member operatively connected to the spindle or the work piece receiving means of the electro erosive machining apparatus and a control unit including a power supply operatively connected to the electric motor as well as to the angular position sensing member.

The input member comprises a pinion member and the output member comprises a first gear wheel and a second gear wheel, the first and second gear wheels being rotatable with reference to each other and both meshing with the pinion member.

The first gear wheel is torsionally fixedly connected to the spindle or the work piece receiving member of the electro erosive machining apparatus, and the second gear wheel is rotatable with reference to the first gear wheel, whereby means are provided to bias the second gear wheel to perform a rotation with reference to the first gear wheel.

The invention is based on the fact that in the case of two gear wheels 1 and 2 meshing with each other, as shown in FIGS. 1 and 2 in a strictly schematic view, there is always a certain more or less pronounced backlash between the tooth flanks engaging each other. In the strongly enlarged, schematic view of FIG. 2, it can be clearly seen that in the case of the gear wheel 1 being the driving gear wheel and rotating in the direction of the arrow there is a backlash between the flanks of the tooth 3 of the gear wheel 2 and the flanks of the tooth 4 of the gear wheel 1 as well as between the flanks of the tooth 6 of the gear wheel 2 and the flanks of the tooth 7 of the gear wheel 1. It is understood that the backlash shown in FIG. 2 is exaggerated for clarity. At the same time, the leading flank of tooth 3 of the gear wheel 2 and the lagging flank of tooth 5 of the gear wheel 1 as well as the leading flank of tooth 6 of the gear wheel 2 and the lagging flank of tooth 4 of the gear wheel 1 rest on each other. If the sense of revolution of the driving gear wheel 1 is reversed, this backlash has a disadvantageous effect. This disadvantageous effect should be avoided with simple measures by the present invention.

Admittedly, in the German Published Patent Application Nr. 38 09 577, there is disclosed a mechanical gear assembly which is said to be free of backlash and self-adjusting. This gear assembly is of a very complicated twin design, whereby in one of the gear chains, there is provided a biased torsion spring element. Such a solution is very lavish and costly. In the German Published Patent Application Nr. 32 25 950, there is disclosed a planetary gear assembly comprising two central gear wheels which slightly differ as far as the number of teeth is concerned. Evidently, such a solution has nothing common with the spirit of the present invention. In the German Published Patent Application Nr. 38 25 136, a gear wheel assembly is disclosed comprising a belt drive which is under the influence of a tensioning roller. Due to the fact that the belt drive takes effect on two gear wheels arranged with parallel axes, it is said that a complete lack of backlash could be achieved. Such a solution is not only very voluminous, but also lavish and costly.

BRIEF DESCRIPTION OF THE DRAWINGS

In the following, an embodiment of the invention will be explained in greater detail, with reference to the accompanying drawings, in which.

DETAILED DESCRIPTION OF A PREFERRED EMBODIMENT

Figure 1:
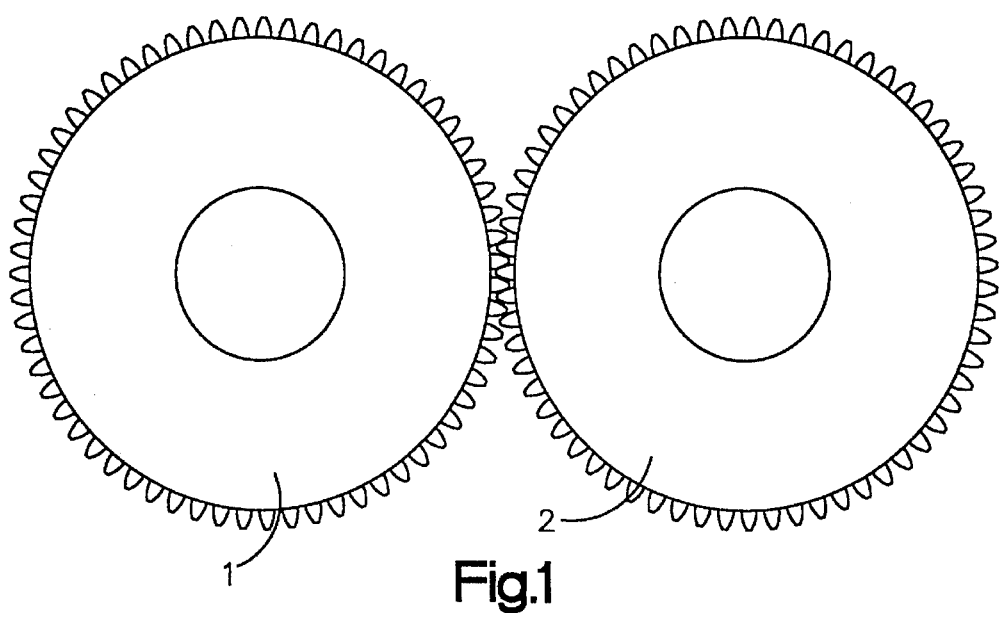
FIG. 1 shows a schematic view of a pair of meshing gear wheels.
Figure 2:
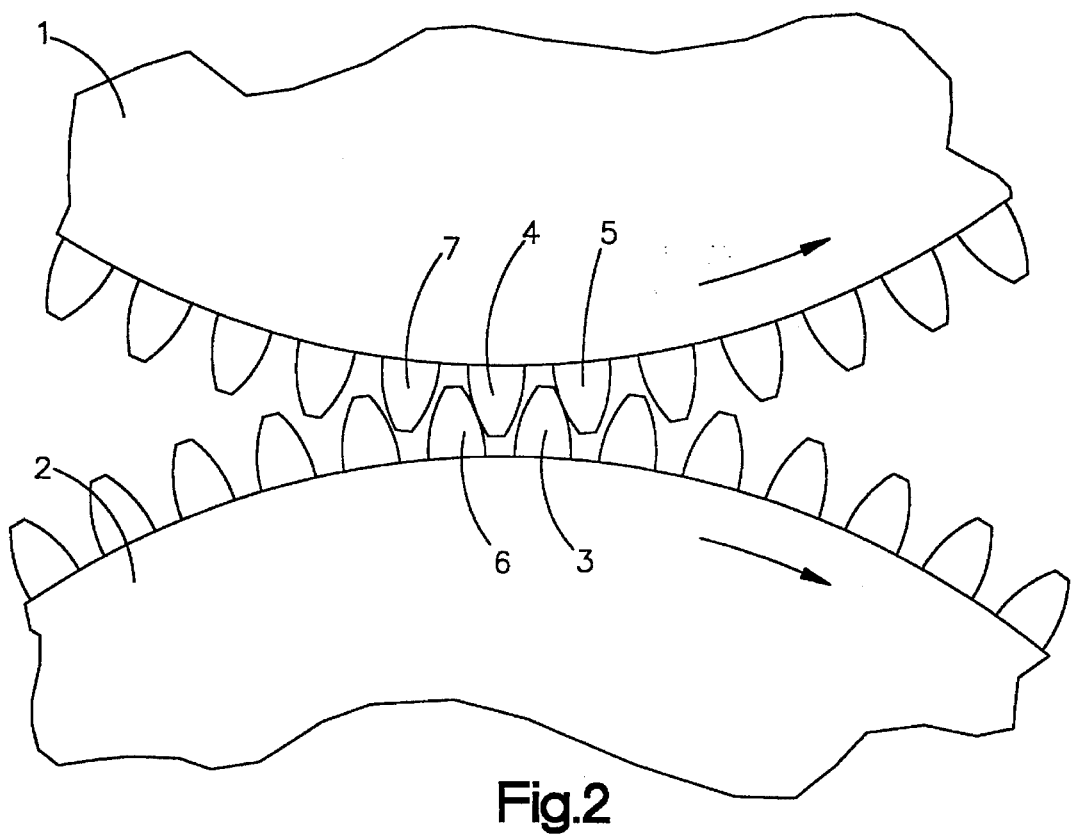
FIG. 2 shows a detail of FIG. 1 in a greater scale.

FIGS. 1 and 2 having already been discussed herein before removes the need to go into these figures more closely.

Figure 3:
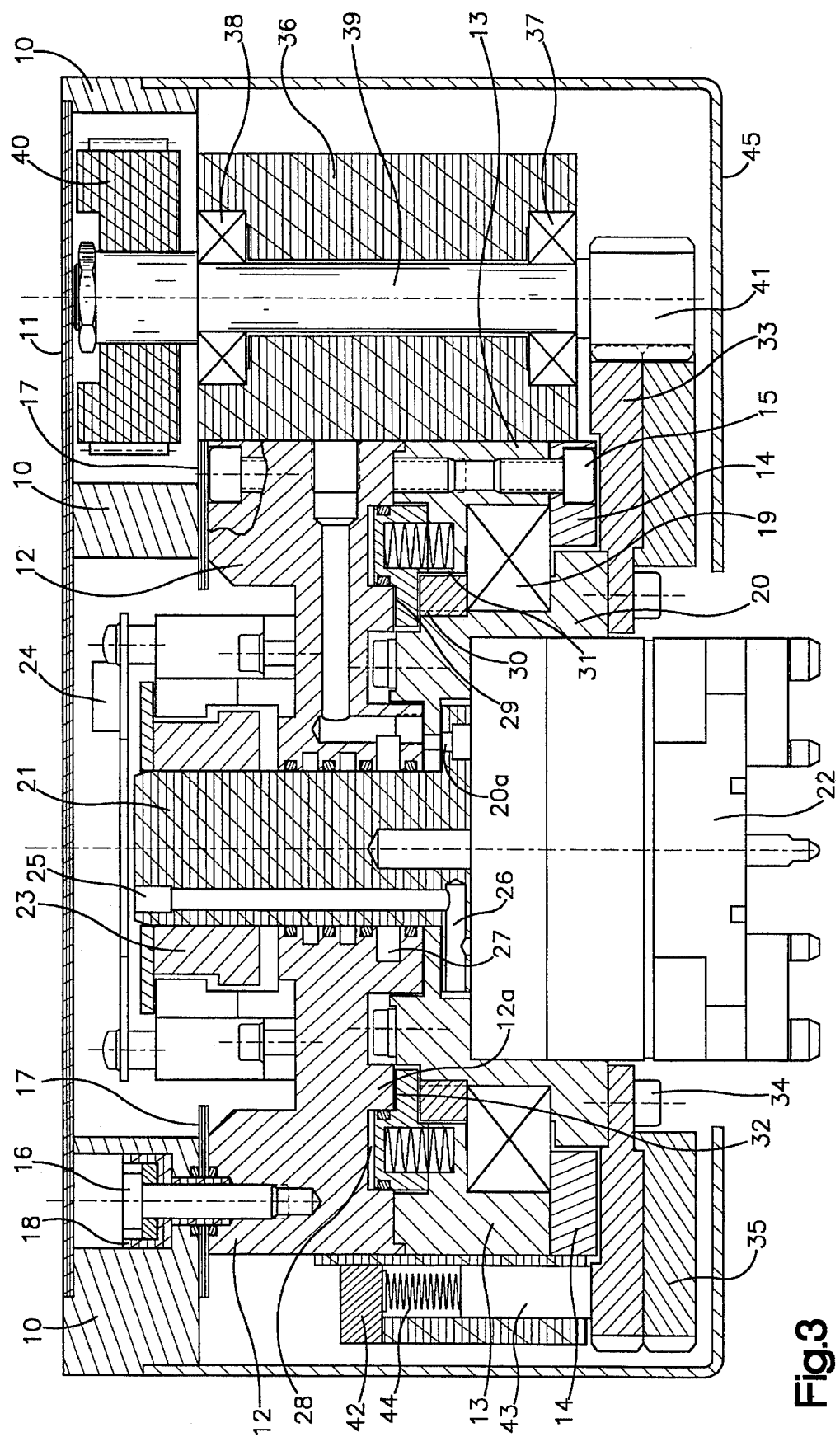
FIG. 3 shows an axial sectional view of an embodiment of the driving apparatus according to the invention.

In FIG. 3, there is shown an embodiment of a driving apparatus for driving the spindle of an electro erosive machining apparatus in an axial sectional view. The apparatus shown in FIG. 3 comprises an upper flange plate member 10 which is covered by a cover plate member 11. Connected to the flange plate member 10 is a frame member consisting of several frame portions, particularly an upper frame portion 12, a bearing housing 13 and a lower flange plate member 14. These three frame portions 12, 13 and 14 are connected to each other by means of screws 15, and the frame formed in this way is connected to the flange plate member 10 by means of screws 16. The frame consisting of the frame portions 12, 13 and 14 has to be electrically insulated with regard to the upper flange plate member 10. For this purpose, there are provided insulating washers 17 and insulating sleeves 18 which are inserted between the upper frame portion 12 and the upper flange plate member 10.

The intermediate frame portion, i.e. the bearing housing 13, is adapted to receive a precision bearing member 19, preferably a precision ball bearing. This bearing is held in the bearing housing 13 by means of the lower flange plate member 14 and secured against axial displacement. The bearing 19 serves for guiding a hub member 20 to which a central shaft member 21 is fixed. By means of the bearing member 19, the hub member 20 and, thereby, the central shaft member 21 is rotatably guided. At the lower end of the shaft member 21, a schematically shown clamping apparatus 22 is fixed which serves e.g. in an electro erosive machining apparatus for receiving the machining electrode (not shown in the drawing). The upper end of the shaft member 21 is provided with an incremental angle encoder 23 which forms, together with a sensor member 24, an angle measuring unit. The angle measuring unit supplies the required information about the angular position of the shaft member 21 to a (not shown) control unit associated with the driving apparatus.

The shaft member 21 is provided with channels 25, 26 running in axial direction, parallel to the central longitudinal axis of the shaft member, and in radial direction which cooperate with annular channels 27. By means of these channels 25, 26 and 27, media required for the operation of the electro erosive machining apparatus can be supplied as for example rinsing fluid, pressurized air for the operation of the clamping apparatus 22, and so on. All these channels 25, 26 and 27 are not shown in detail and will not be further explained here because they are not essential for the spirit of the present invention.

The upper frame portion 12 is provided with an annular groove 28 adapted to receive an annular piston member 29. The annular piston member 29 is provided with an annular protrusion 30 projecting radially inwardly. The hub member 20 is provided with a brake disc member 32 fixed to its upper end face. The brake disc member 32 is connected to the hub member 20 by means of screws 20a. The brake disc member 32 projects into a chamber between a squeezing edge 12a of the upper frame portion 12 and the upper end face of the protrusion 30. The piston member 29 is pressed against the squeezing edge 12a by means of spring members 31 and thereby jams the brake disc 32; in other words, the brake is on in its rest position under the influence of the spring members 31. If the piston member 29 is actuated under the influence of a pressure fluid,—the channels for supplying pressure fluid into the chamber above the annular piston member 29 cannot be seen in FIG. 3 —, the protrusion 30 is downwardly displaced and, thereby, the brake released. By this design, a disc brake is realized by means of which the hub member 20 and, thereby, the clamping apparatus is reliably fixed in a desired angular position.

The lower end face of the hub member 20 is provided with a first gear wheel 33 which is torsionally fixedly connected to the hub member 20 by means of screws 34. Connected to this first gear wheel 33 is a second gear wheel 35. The second gear wheel 35 is located coaxially to and rotatably with regard to the first gear wheel 33. The design of these two gear wheels 33 and 35 and their operation will be discussed in more detail herein after.

To one side of the frame member constituted by the frame portions 12, 13 and 14, a bearing pedestal 36 is connected which is adapted to receive a shaft member 39 rotatably supported in two bearing members 37 and 38. The upper end of the shaft member 39 is provided with a pulley 40 which is to be driven by an electric motor via a toothed belt. The electric motor and the toothed belt are not shown in the drawings since these elements and their application are well known in the art. The gear ratio between electric motor and pulley 40 may be in the region of about 3:1. The lower end of the shaft member 39 is provided with a pinion member 41 which meshes with the two coaxially arranged gear wheels 33 and 35. The gear ratio between pinion member 41 and gear wheels 33, 35 can be chosen to be in the region of about 10:1.

For conducting the electric current required for the operation of the electro erosive machining apparatus from the stationary part of the driving apparatus to the rotating elements thereof, the frame constituted by the frame portions 12, 13 and 14 is provided with a plurality of brush cabinets 42 which are laterally fixed to the afore mentioned frame. The brush cabinets 42 are adapted to receive a pair of carbon brushes 43. The carbon brushes 43 are pressed against the surface of the first gear wheel 33 by means of pressure spring members 44. In the view according to FIG. 3, only one brush cabinet 42 with associated pair of carbon brushes 43 can be seen, but preferably a plurality of brush cabinets 42 with carbon brushes 43 are provided which are evenly distributed over the circumference of the frame constituted by the frame portions 12, 13 and 14. The entire assembly, finally, is covered by a housing 45 which is provided, at its bottom, with an aperture for the clamping apparatus 22.

Figure 4:
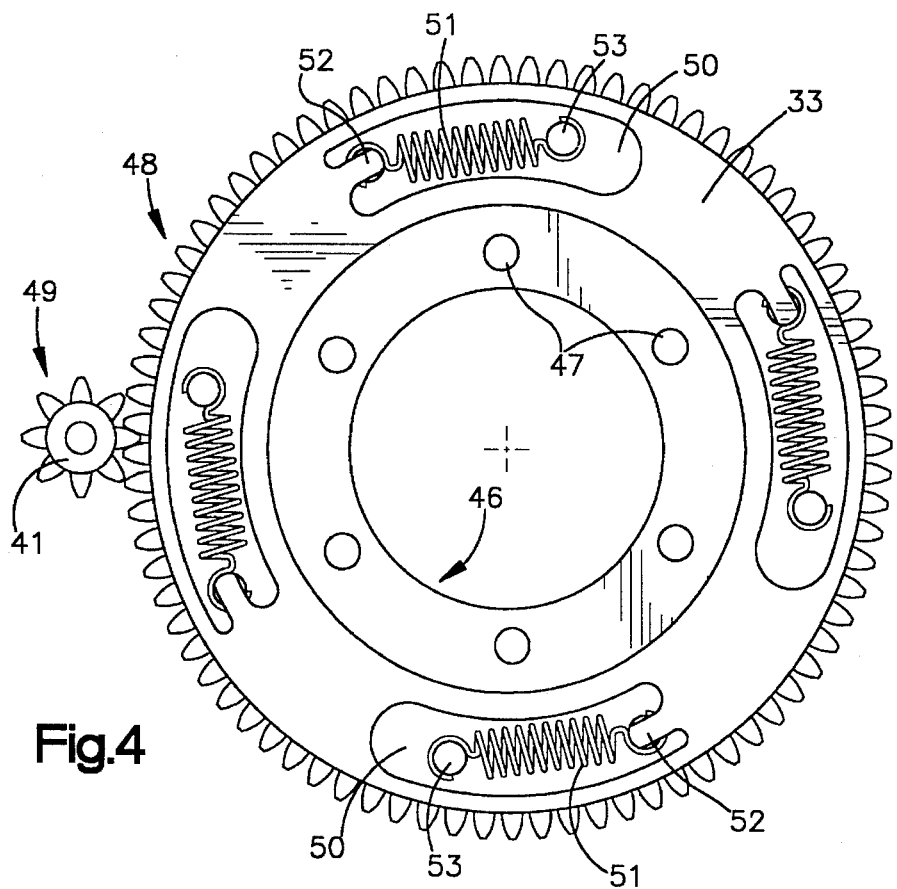
FIG. 4 shows a top view of the first gear wheel which is torsionally fixedly connected to the spindle of an electro erosive machining apparatus.
Figure 5:
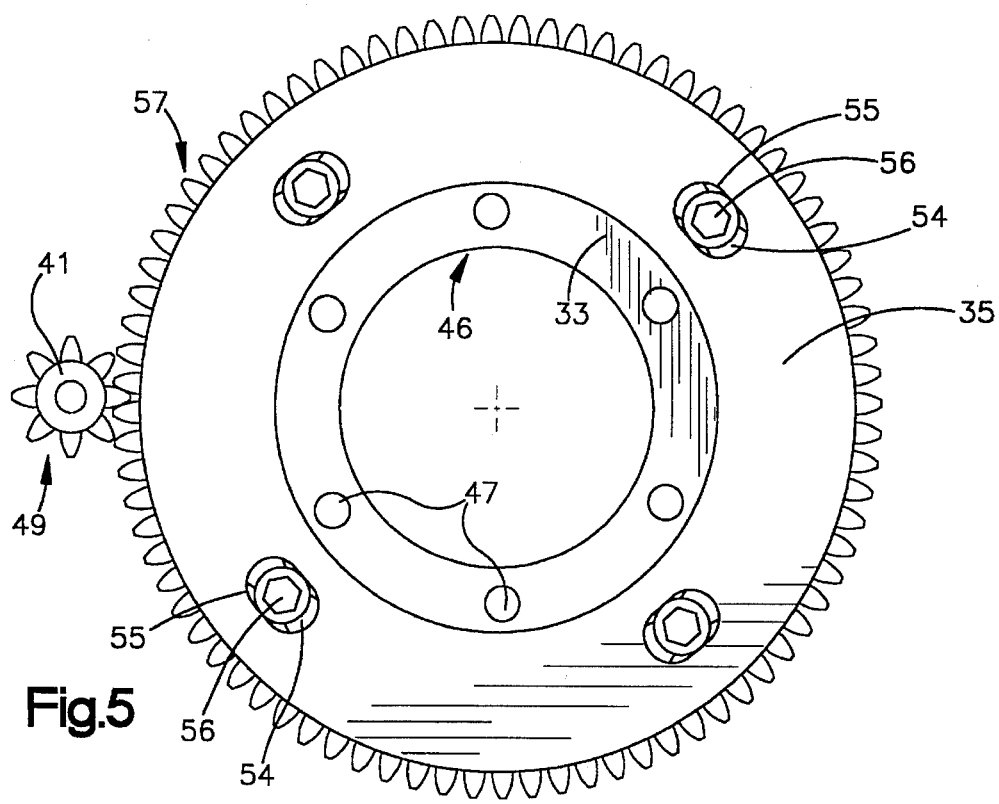
FIG. 5 shows a bottom view of the second gear wheel which is rotatably connected to the first gear wheel.

In FIGS. 4 and 5, the two gear wheels 33 and 35 are shown as components removed from the driving apparatus shown in FIG. 3. In each case, the pinion member 41 is additionally shown just for clarity. Thereby, FIG. 4 is a top view of the first gear wheel 33 which is torsionally fixedly connected to the spindle of the electro erosive machining apparatus, i.e. the shaft member 21, and FIG. 5 is a bottom view of the second gear wheel 35 rotatably connected to the first gear wheel 33.

The first gear wheel 33 is provided with a central bore 46 having a diameter which is somewhat greater than the diameter or the greatest lateral dimension of the clamping apparatus 22 since the first gear wheel surrounds the clamping apparatus 22 as can be clearly seen in FIG. 3. The bores 47 evenly distributed around the central bore 46 serve for receiving screws 34 for the fixing of the first gear wheel 33 to the hub member 20. The first gear wheel 33 is provided with a toothing 48 along its periphery adapted to mesh with the toothing 49 provided on the pinion member 41.

The first gear wheel 33 is provided with a plurality of arc shaped slots 50 which are adapted to receive tension spring members 51. One end portion of the arc shaped slots 50 is provided with hook-shaped anchoring members 52 which can be fixed to the first gear wheel 33 or, alternatively, form an integral part of the gear wheel 33. One end of the tension spring members 51 is attached to the anchoring members 52; the other end of the tension spring members 51 is, in each case, linked to a pin member 53 provided on the second gear wheel 35. The pin members 53 project perpendicularly from that surface of the second gear wheel 35 which faces the first gear wheel 33 and penetrate the above mentioned arc shaped slots 50. Another possibility (not shown in the drawings) is to provide the first gear wheel 33 with a plurality of arc shaped recesses for receiving the spring means 51. Correspondingly, these arc shaped recesses would be provided with similar anchoring members 52 to which one end of the spring members 51 is attached.

The second gear wheel 35 is connected to the first gear wheel 33 in coaxial relationship in such a manner that it can rotate with regard to the first gear wheel 33 by a small amount. For this purpose, the second gear wheel 35 is provided with four essentially oval shaped apertures 54 which are provided each with shoulders 55 recessed with regard to the surface of the second gear wheel 35 and extending on both sides of the oval shaped apertures 54 in circumferential direction. Inserted into the oval shaped apertures 54 are self-locking screws 56, the screw head thereof resting on the above mentioned shoulders 55. The screws 56 are received in correspondingly located threaded bores (not shown) provided in the first gear wheel 33. It is understood that the screws 56 are not tightened, but screwed in only to such an extent that the second gear wheel 35 is rotatable with regard to the first gear wheel 33. Such a rotational movement is limited by the dimensions of the oval shaped apertures 54.

The second gear wheel 35 is provided with a peripheral toothing 57 which corresponds exactly to the peripheral toothing 48 of the first gear wheel 33 and which meshes with the toothing 49 of the pinion member 41 as well.

Under the influence of the tangentially acting tension force exerted by the tension springs 51 which engage, on the one hand, at the first gear wheel 33 and, on the other hand, on the second gear wheel 35, the two gear wheels 33 and 35 have the aim to rotate in different directions. Due to the fact that both gear wheels 33 and 35 mesh with the same pinion member 41, such a orientation-reversing rotation is not possible or possible only to a very small extent. In other words, such orientation-reversing rotation is possible insofar until eventually present backlash between the toothings 48 and 57, respectively, of the gear wheels 33 and 35, respectively, and the toothing 49 of the pinion member 41 is compensated.

The tension force of the spring members 51 is dimensioned such that the biasing torque created in this way is greater than the highest torque value to be generated or transmitted by the driving apparatus. On the other hand, the tension force of the spring members 51 should not be excessively high in order to avoid that the friction between the toothings 48 and 57, respectively, of the gear wheels 33 and 35, respectively, and the toothing 49 of the pinion member 41 becomes unnecessarily high and to avoid a premature wear. In view of the fact that a driving apparatus for the spindle of an electro erosive machining apparatus has to transmit only very small torque values, the problem with the dimensioning of the spring members 51 is not difficult to solve and should be well within the knowledge of any person skilled in the art.

In the driving apparatus according to the invention, the first and second gear wheels 33 and 35, respectively, are always biased with reference to each other with the result that the tooth flanks of the gear wheels 33 and 35, respectively, always rest on the tooth flanks of the pinion member 41, in each case and in both senses of rotation. In a first sense of rotation, the torque is transmitted from the pinion member 41 to the shaft member 21 of the driving apparatus, i.e. the spindle of the electro erosive machining apparatus, directly via the fixedly mounted first gear wheel 33. In a second sense of rotation, the torque is transmitted from the pinion member 41 to the shaft member 21 of the driving apparatus, i.e. the spindle of the electro erosive machining apparatus, via the second gear wheel 35 and the spring members 51.

Should wear occur at the toothings 48 and 57, respectively, of the gear wheels 33 and 35, respectively, and at the toothing 49 of the pinion member 41, there is absolutely no influence on the ability of function or the accuracy of the angular positioning of the spindle of the electro erosive machining apparatus since an eventually occurring increased backlash is automatically compensated under the influence of the spring members 51.

The driving apparatus according to the invention is particularly suitable for driving the spindle of an electro erosive machining apparatus to a well defined angular position with a very high positional accuracy. However, the driving apparatus of the invention could also be used for other applications in which a backlash-free, highly precise transmission of rotational movements is required, as for example the work piece receiving means of a machining apparatus and so on. The driving apparatus of the invention is of very simple design and, thus, can be manufactured at comparatively low costs. Moreover, it has very compact dimensions and has lower demands as far as the control means is concerned than a solution with two electro motors which are driven to a contrary rotational movement.

What is claimed is:

1. An electroerosive machining apparatus, comprising: a spindle or a workpiece receiving means;

a reversible electric motor;

reduction gear means associated with said electric motor including an input member operatively connected to said electric motor and driven by said electric motor as well as an output member operatively connected to the spindle or the work piece receiving means of the electroerosive machining apparatus;

an angular position sensing means operatively connected to the spindle or the work piece receiving means of the electro erosive machining apparatus;

control means including power supply means operatively connected to said electric motor as well as to said angular position sensing means;

said input member comprising a pinon member and said output member comprising a first gear wheel means and a second gear wheel means, said first and second gear wheel means being rotatable with reference to each other and both meshing with said pinion member;

said first gear wheel means being torsionally fixedly connected to the spindle or the work piece receiving means of the electro erosive machining apparatus, and said second gear wheel means being rotatable with reference to said first gear wheel means; and further comprising means to bias said second gear wheel means to perform a rotation with reference to said first gear wheel means.

2. A driving apparatus according to claim 1 in which the rotational movement of said second gear wheel means is limited with regard to the angle of rotation.

3. A driving apparatus according to claim 1 in which said second gear wheel means is rotatably connected to said first gear wheel means.

4. A driving apparatus according to claim 1 in which said means to bias said second gear means comprises tension spring means.

5. A driving apparatus according to claim 1 in which at least one of said first and second gear wheel means is provided with at least one arc shaped slot extending in circumferential direction and adapted to receive a tension spring means.

6. A driving apparatus according to claim 5 in which both said first and second gear wheel means are provided with anchoring means projecting into at least one arc shaped slot and to which the ends of said spring means are attached, whereby the anchoring means of one of said first and second gear wheel means is located at the one end of said arc shaped slot and the anchoring means of the other one of said first and second gear wheel means is located in the region of the other end of said arc shaped slot.

7. A driving apparatus according to claim 5 in which there are provided four arc shaped slots which are evenly distributed along the circumference of one of said first and second gear wheel means.

8. A driving apparatus according to claims 1 in which at least one of said first and second gear wheel means is provided with at least one arc-shaped recess extending in circumferential direction and adapted to receive a tension spring means.

9. A driving apparatus according to claim 8 in which both said first and second gear wheel means are provided with anchoring means projecting into at least one arc shaped recess and to which the ends of said spring means are attached, whereby the anchoring means of one of said first and second gear wheel means is located at the one end of said arc shaped recess and the anchoring means of the other one of said first and second gear wheel means is located in the region of the other end of said arc shaped recess.

10. A driving apparatus according to claim 8 in which there are provided four arc shaped recesses which are evenly distributed along the circumference of one of said first and second gear wheel means.

11. A driving apparatus according to claim 1 in which the biasing force exerted by said means to bias said second gear wheel means, multiplied with the distance between the axis of rotation of said spindle and the point of action of said biasing means, is greater than the highest torque to be exerted or transmitted by said spindle or work piece receiving means of said electro erosive machining apparatus.

* * * * *